US007683315B2

(12) United States Patent
Belford et al.

(10) Patent No.: US 7,683,315 B2

(45) Date of Patent: Mar. 23, 2010

(54) FAIMS CELL HAVING AN OFFSET ION INLET ORIFICE

(75) Inventors: Michael W. Belford, Los Altos, CA (US); Jean Jacques Dunyach, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 297 days.

(21) Appl. No.: 11/767,280

(22) Filed: Jun. 22, 2007

(65) Prior Publication Data

US 2008/0315085 A1 Dec. 25, 2008

(51) Int. Cl.
*B01D 59/44* (2006.01)
*H01J 49/00* (2006.01)
*H01J 49/40* (2006.01)

(52) U.S. Cl. ........................ 250/288; 250/281; 250/287

(58) Field of Classification Search ................. 250/281, 250/285, 287, 288

See application file for complete search history.

(56) References Cited

U.S. PATENT DOCUMENTS 5,420,424 A * 5/1995 Carnahan et al. ............ 250/287
6,504,149 B2 1/2003 Guevremont et al.
6,753,522 B2 6/2004 Guevremont et al.
6,770,875 B1 * 8/2004 Guevremont et al. ....... 250/288
6,806,466 B2 10/2004 Guevremont et al.
6,995,365 B2 * 2/2006 Farnsworth ................. 250/291
7,005,633 B2 * 2/2006 Guevremont et al. ....... 250/287
7,034,286 B2 4/2006 Guevremont et al.
7,186,972 B2 * 3/2007 Farnsworth ................. 250/287
7,189,972 B2 * 3/2007 Ertel et al. ............. 250/370.11
7,378,651 B2 * 5/2008 Guevremont ............... 250/287
7,397,027 B2 * 7/2008 Li .............................. 250/287

FOREIGN PATENT DOCUMENTS

WO WO 2004029603 A2 * 4/2004

* cited by examiner

*Primary Examiner*—Jack I Berman
*Assistant Examiner*—Brooke Purinton
(74) *Attorney, Agent, or Firm*—Freedman & Associates; Charles B. Katz; Thomas F. Cooney

(57) ABSTRACT

A FAIMS cell has an elongated inner electrode with a longitudinal axis extending along a first direction. The inner electrode has a curved outer surface that defines a circle when viewed in a cross section that is taken in a plane normal to the longitudinal axis, which itself passes through the center of the circle so defined. An outer electrode having an inner surface is disposed in a spaced-apart facing relationship relative to the outer surface of the inner electrode so as to define an analytical gap therebetween. A first ion inlet orifice is defined through a first portion of the outer electrode, and an ion outlet orifice is defined through a second portion of the outer electrode. In particular, the first ion inlet orifice has a first ion injection axis that does not pass through the center of the circle. Furthermore, the second electrode does not have defined through any portion thereof an ion inlet orifice having an ion injection axis that passes through the center of the circle.

26 Claims, 10 Drawing Sheets

FAIMS CELL HAVING AN OFFSET ION INLET ORIFICE

FIELD OF THE INVENTION

The instant invention relates generally to High Field Asymmetric Waveform Ion Mobility Spectrometry (FAIMS), and more particularly to a FAIMS cell having an offset ion inlet orifice.

BACKGROUND OF THE INVENTION

High Field Asymmetric Waveform Ion Mobility Spectrometry (FAIMS) is a technology that is capable of separating gas-phase ions at atmospheric pressure. In FAIMS, the ions are introduced into an analytical gap across which a radio frequency (rf) waveform, the magnitude of which is referred to as dispersion voltage (DV), is applied such that the ions are alternately subjected to high and low electric fields. The waveform is asymmetric; the high field is applied for one time unit followed by an opposite-polarity low field of half the high field component that is applied for twice as long. The field-dependent change in the mobility of the ions causes the ions to drift toward the walls of the analytical gap. Since the dependence of ion mobility on electric field strength is compound specific, this leads to a separation of the different types of ions one from the other, and is referred to as the FAIMS separation or the FAIMS mechanism. In order to transmit an ion of interest through FAIMS, an appropriate direct current compensation voltage (CV) is applied to compensate for the drift of the ion of interest toward the analyzer wall. By varying the CV, different ions are selectably transmitted through the FAIMS device.

Different FAIMS electrode geometries are known in the art. One specific type of electrode geometry, which is referred to as the "side-to-side" FAIMS geometry, includes typically a set of overlapping inner and outer electrodes. In particular, the inner electrode often is provided in the form of a circularly cylindrical rod-shaped electrode, whilst the outer electrode has a similarly curved inner surface that is spaced-apart from and facing the inner electrode. The annular space between the inner electrode and outer electrode defines an analytical gap for separating different types of ions one from another, according to the above-mentioned FAIMS mechanism. Ions are produced at an ionization source, such as for instance an electrospray ionization (ESI) source, and are introduced into the analytical gap via one or more ion inlet orifices. Once inside the analytical gap, the ions travel circumferentially in both directions around the inner electrode toward an ion outlet orifice. Some types of ions do not have stable trajectories under the selected combination of CV and DV and are lost due to collisions with an electrode surface, whilst other types of ions are carried to the ion outlet orifice and then out of the analytical gap for subsequent analysis or collection.

A feature that is common to all current side-to-side FAIMS devices, as well as FAIMS devices that are based on some other common electrode geometries, is that at least one ion inlet orifice is defined through the outer electrode in such a way that ion introduction is opposed directly by the electrical field within the analytical gap during one portion of the asymmetric waveform cycle. In fact, the electrical field extends into the ion inlet orifice and accordingly the electrical field begins to influence ion motion even before the ions actually enter the analytical gap. The result is that within the ion inlet orifice, and immediately after the ions enter the analytical gap, the ion trajectories oscillate first directly toward the inner electrode during application of one portion of the asymmetric waveform and then directly away from the inner electrode during application of another portion of the asymmetric waveform. Thus, the ions tend to "jitter" in and out of the analytical gap during introduction, although the net motion is still toward the inner electrode since the ions are also entrained in a flow of a carrier gas. Once inside the analytical gap, the carrier gas flow splits and carries the ions in both directions around the inner electrode. The electrical field continues to induce the same oscillations in the ion trajectories, and only those ions for which the oscillations are compensated by the compensation voltage actually reach the ion outlet orifice.

The above-mentioned "jitter" motion that occurs during ion introduction has a tendency to increase the width of the ion injection window as well as to decrease the ion introduction efficiency. Since one of the advantages of the side-to-side FAIMS device is the short ion flow path length around the inner electrode, and consequently a relatively short ion transit time through the analytical gap, it will be apparent that a longer ion injection window has an adverse effect on the performance of a side-to-side FAIMS device. Accordingly ion inlet configurations, such as those described previously by Guevremont et al. in U.S. Pat. No. 6,753,522 and including three or more separate ion inlet orifices that are arranged in rows or other geometrical arrangements, tend not to result in optimal performance. In particular, each ion inlet configuration disclosed by Guevremont et al. includes at least one ion inlet orifice that is defined through the outer electrode in such a way that ion introduction is opposed directly by the electrical field within the analytical gap during one portion of the asymmetric waveform cycle. This is particularly problematic when the side-to-side FAIMS device is being used to separate or analyze ions on a very short time scale. One such example involves analysis of ions that are generated from samples that are eluting from a high-performance liquid chromatography (HPLC) apparatus, or from another similar chromatographic apparatus.

Of course, the same "jitter" motion also occurs when ions are introduced into FAIMS devices that are based on other electrode geometries. Of particular note is the so-called domed-FAIMS (d-FAIMS) electrode geometry. In a d-FAIMS device, ions enter into an analytical gap between two concentric cylindrical electrodes and spread out in a ring-shaped cloud of finite thickness at a particular radial distance between the two electrodes. The ions travel along the length of the device and are directed radially inward around a domed surface terminus of the inner electrode prior to being extracted via an ion outlet orifice. Since the ions are introduced via an ion inlet in such a way that ion introduction is opposed directly by the electrical field within the analytical gap during one portion of the asymmetric waveform cycle, the d-FAIMS device is expected to show behavior similar to that which has been described above.

Accordingly, there exists a need for a FAIMS cell that overcomes at least some of the above-mentioned limitations.

SUMMARY OF EMBODIMENTS OF THE INVENTION

According to an aspect of the instant invention there is provided a FAIMS cell, comprising: an elongated inner electrode having a longitudinal axis extending along a first direction, the inner electrode having a curved outer surface that defines a circle when viewed in a cross section that is taken in a plane normal to the longitudinal axis, the longitudinal axis passing through the center of the circle so defined; and, an outer electrode having an inner surface that is disposed in a spaced-apart facing relationship relative to the outer surface of the inner electrode so as to define an analytical gap therebetween, there being a first ion inlet orifice defined through a first portion of the outer electrode for supporting introduction of a flow of ions into the analytical gap, and there being an ion outlet orifice defined through a second portion of the outer electrode for supporting extraction of some ions of the flow of ions from the analytical gap, the first ion inlet orifice having a first ion injection axis that does not pass through the center of the circle so defined, wherein the second electrode does not have defined through any portion thereof an ion inlet orifice having an ion injection axis that passes through the center of the circle so defined According to another aspect of the instant invention, provided is a FAIMS cell, comprising: a generally cylindrically-shaped inner electrode having an outer surface; and, an outer electrode having an inner surface that is disposed in a spaced-apart overlapping relationship relative to the outer surface of the inner electrode so as to define an analytical gap therebetween, there being a first ion inlet orifice defined through a first portion of the outer electrode for supporting introduction of a flow of ions into the analytical gap, the first ion inlet orifice being open at opposite ends thereof and having a first ion injection axis that passes through the center of each one of the opposite ends, the first ion injection axis not being normal to the outer surface of the inner electrode at the point of intersection, wherein the outer electrode does not have defined through any portion thereof an ion inlet orifice having an ion injection axis that is normal to the outer surface of the inner electrode at the point of intersection.

According to still another aspect of the instant invention, provided is a FAIMS cell, comprising: a generally cylindrically-shaped inner electrode having an outer surface; and, an outer electrode having an inner surface that is disposed in a spaced-apart overlapping relationship relative to the outer surface of the inner electrode so as to define an analytical gap therebetween, there being a first ion inlet orifice defined through a first portion of the outer electrode for supporting introduction of a flow of ions into the analytical gap, the first ion inlet orifice being open at opposite ends thereof and having a first ion injection axis that passes through the center of each one of the opposite ends of the first ion inlet, the first ion injection axis being substantially tangential to the outer surface of the inner electrode.

BRIEF DESCRIPTION OF THE DRAWINGS

Exemplary embodiments of the invention will now be described in conjunction with the following drawings, in which similar reference numerals designate similar items.

DESCRIPTION OF EMBODIMENTS OF THE INSTANT INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

The elements of the various embodiments of the instant invention have been described specifically with reference to only the side-to-side FAIMS electrode geometry. However, it is to be clearly understood that the same elements may equally be incorporated into FAIMS devices that are based on other electrode geometries, such as for instance the domed-FAIMS (d-FAIMS) geometry. In fact, the ion inlet regions of the two types of FAIMS devices are substantially identical. Accordingly, while the drawings are intended to show a side-to-side FAIMS cell, they nevertheless are also quite illustrative of a d-FAIMS cell.

Figure 1A:
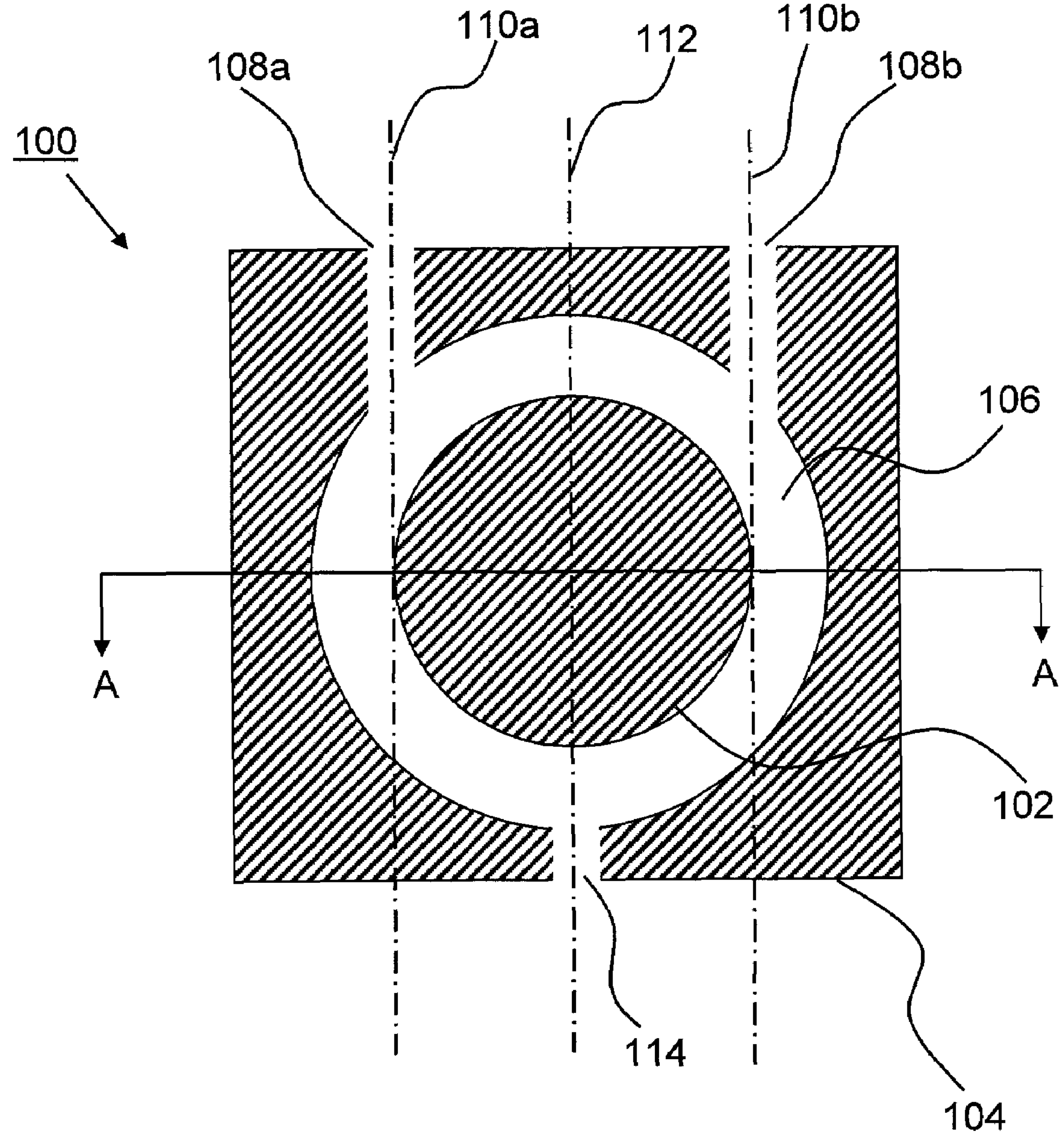
FIG. 1*a* is a cross sectional end-view of a side-to-side FAIMS cell according to an embodiment of the instant invention.

Referring to FIG. 1*a*, shown is a cross sectional end-view of a side-to-side FAIMS cell according to an embodiment of the instant invention. The side-to-side FAIMS cell, which is shown generally at 100, includes an analyzer region that is defined by inner and outer electrodes 102 and 104, respectively. The inner electrode 102 is approximately circular in cross-section and has a generally cylindrical outer surface. The outer electrode 104 has a similarly curved inner surface that faces the outer surface of the inner electrode 102. An electrically insulating material (not shown in FIG. 1*a*) supports the inner electrode 102 and the outer electrode 104 in an overlapping, spaced-apart arrangement one relative to the other. An annular space between the outer surface of the inner electrode 102 and the inner surface of the outer electrode 104 defines an analytical gap 106 for separating different types of ions, one from another. The analytical gap 106 is of approximately uniform width and extends around the circumference of the inner electrode 102. The inner electrode 102 is in electrical communication with a not illustrated voltage source, which during use is capable of applying a high voltage asymmetric waveform (DV) and a low voltage dc compensation voltage (CV) to the inner electrode 102. Optionally, the not illustrated voltage source applies the DV to the outer electrode 104. Further optionally, the not illustrated voltage source applies the DV to the inner electrode 102 and to the outer electrode 104.

During use, ions are produced at a not illustrated ionization source and enter the analytical gap 106 via two ion inlet orifices 108*a* and 108*b*. One non-limiting example of a suitable ionization source is an electrospray ionization (ESI) source. However, when an ESI source is used with FAIMS, it is desirable to remove residual liquid solvent prior to introducing the ion stream into the analytical gap 106. To this end, typically a separate desolvation chamber (not shown) is provided between the ionization source and the FAIMS cell. Of course, any other suitable ionization source may be utilized to produce ions. Optionally, separate ionization sources are provided including a first not illustrated ion source that is in fluid communication with ion inlet orifice 108*a* and a second ionization source that is in fluid communication with ion inlet orifice 108*b*.

Referring still to FIG. 1*a*, dotted lines 110*a* and 110*b* are shown extending along the longitudinal axis of the ion inlet orifices 108*a* and 108*b*, respectively. Each dotted line is referred to as the ion injection axis of the corresponding ion inlet orifice. In the embodiment of FIG. 1*a*, ion injection axis 110*a* is parallel to ion injection axis 110*b*. Furthermore, dotted line 112 represents a plane of symmetry extending into and out of the plane of the page, which bisects the inner electrode 102 along the length thereof and that also bisects ion outlet orifice 114. The ion inlet orifices 108*a* and 108*b* are disposed symmetrically with respect to the plane of symmetry. Ions that are introduced via ion inlet orifice 108*a* travel along one direction (counter-clockwise in FIG. 1*a*) toward the ion outlet orifice 114. Similarly, ions that are introduced via ion inlet orifice 108*b* travel along a different direction (clockwise in FIG. 1*a*) toward the ion outlet orifice 114. The net ion flow path between ion inlet orifice 108*a* and the ion outlet orifice 114 is substantially a reflection in the plane of symmetry of the net ion flow path between ion inlet orifice 108*b* and the ion outlet orifice 114. Accordingly, ion residence times within the analytical gap 106 are substantially the same for a particular type of ion that is introduced via either the ion inlet orifice 108*a* or the ion inlet orifice 108*b*.

The ion injection axis 110*a* is substantially tangential to the outer surface along one side of inner electrode 102, and the ion injection axis 110*b* is substantially tangential to the outer surface along the opposite side of inner electrode 102. Accordingly, FAIMS cell 100 does not have any ion inlet orifices with an ion injection axis that passes through the center of inner electrode 102. Another way of stating this is to say that FAIMS cell 100 does not have any ion inlet orifices with an ion injection axis that is normal to the outer surface of the inner electrode 102 at the point of intersection.

Figure 1B:
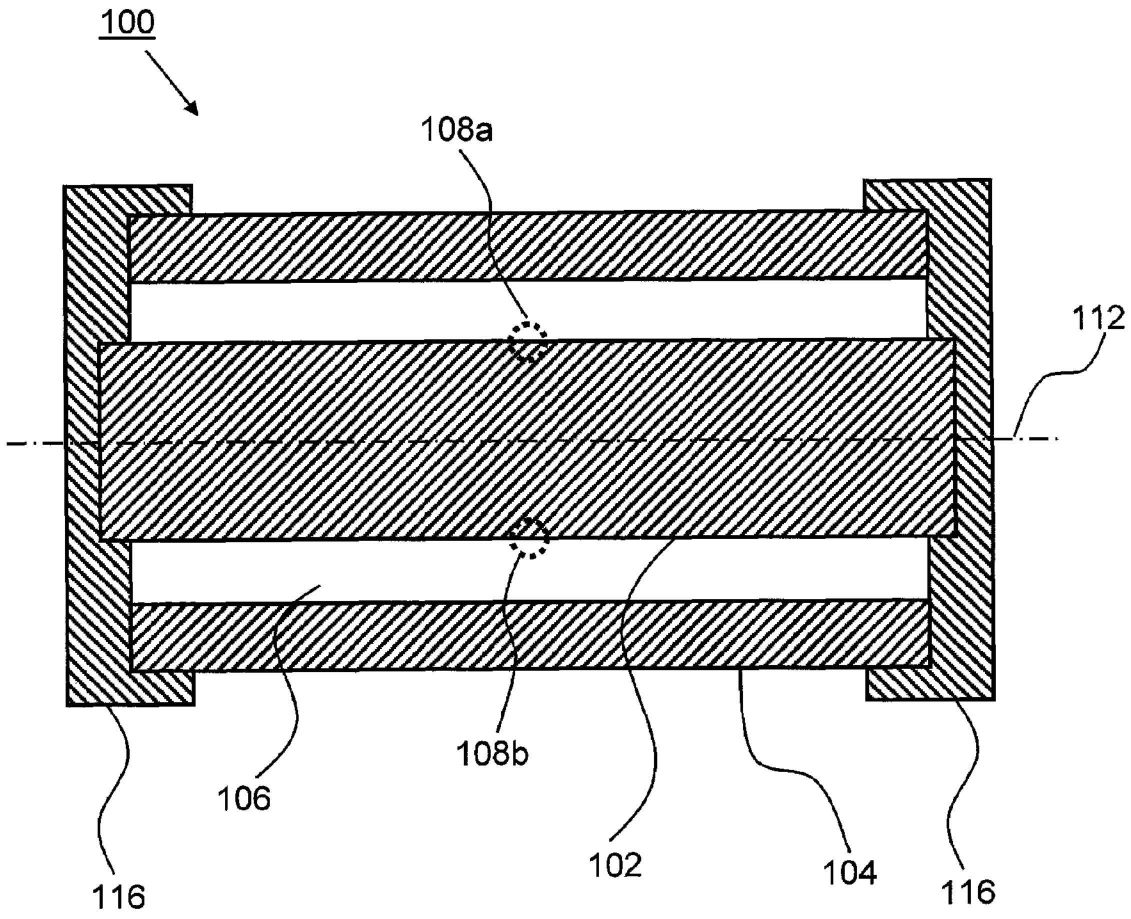
FIG. 1*b* is a cross sectional top-view of a side-to-side FAIMS cell according to an embodiment of the instant invention.

Referring now to FIG. 1*b*, shown is a cross sectional top-view of the side-to-side FAIMS cell of FIG. 1*a*, taken along the line A-A. FIG. 1*b* shows an electrically insulating material 116 supporting the inner electrode 102 relative to the outer electrode 104 so as to define the analytical gap 106. The locations of the ion inlet orifices 108*a* and 108*b* relative to the plane of symmetry 112 are shown as dotted circles.

Figure 2A:
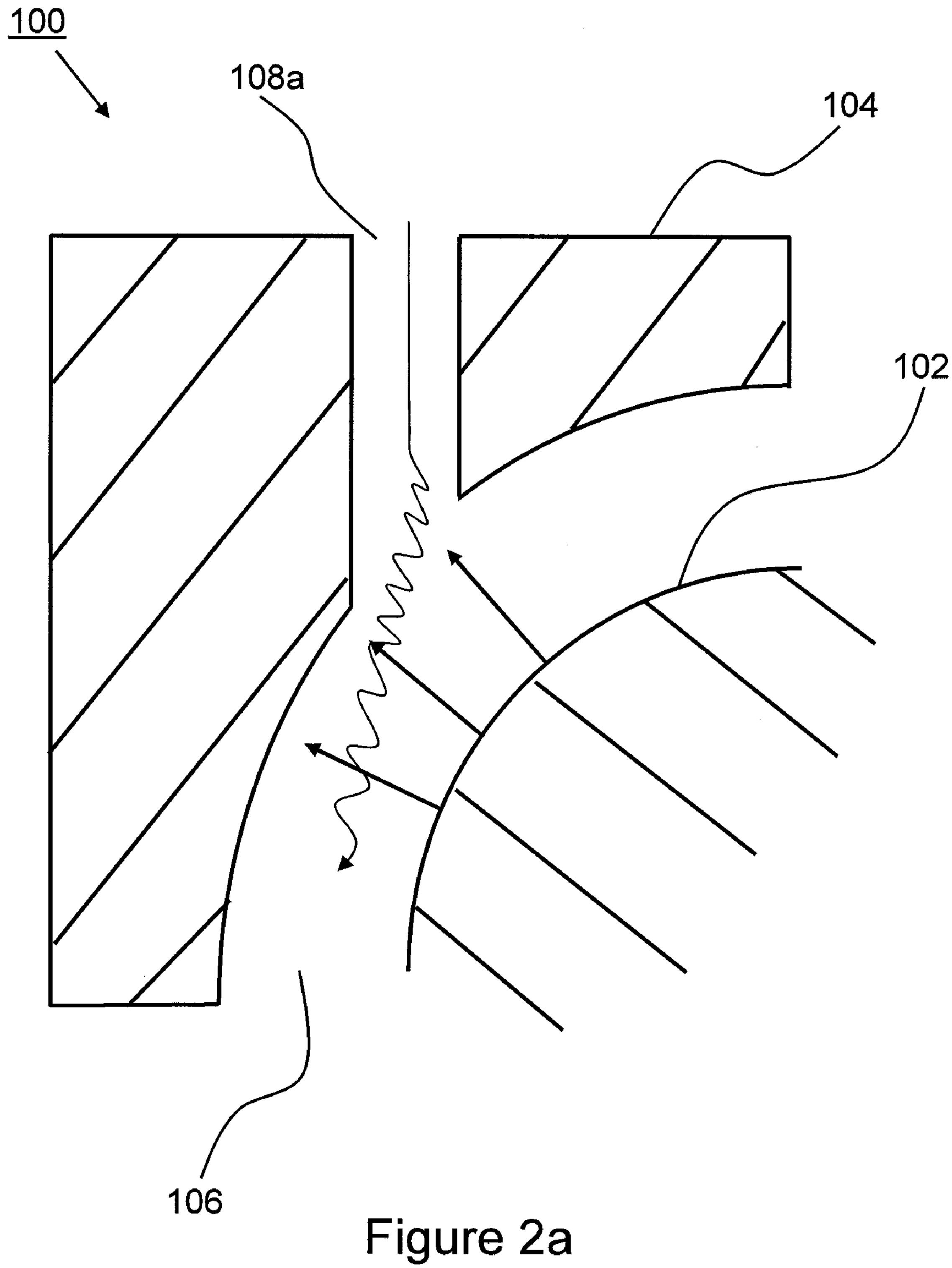
FIG. 2*a* is an enlarged cross sectional view of the ion inlet orifice of the side-to-side FAIMS cell that is shown in FIG. 1*a;*
Figure 2B:
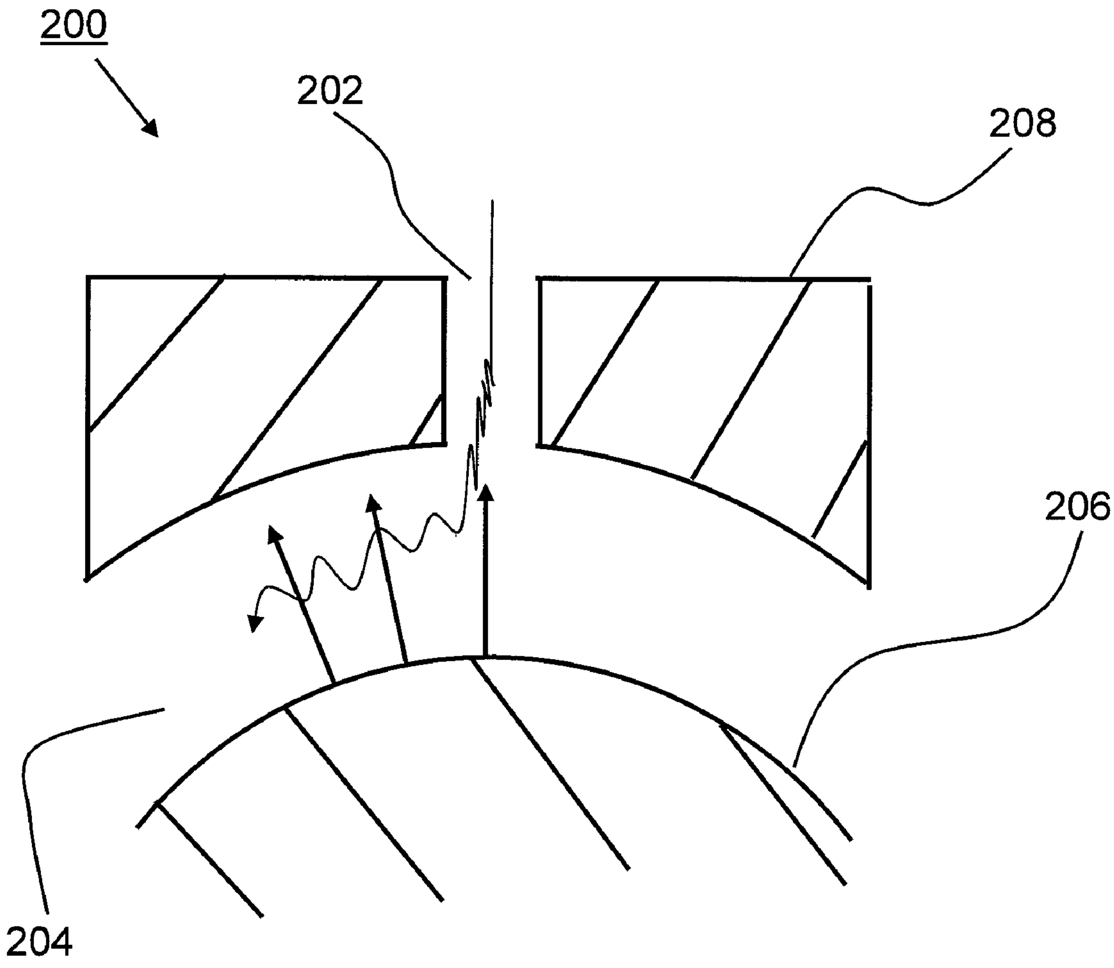
Figure 2b (Prior Art)
FIG. 2*b* is an enlarged cross sectional view of an ion inlet orifice of a prior art side-to-side FAIMS cell.

Referring now to FIG. 1*a* and FIG. 1*b* together, the ions are introduced into FAIMS cell 100 along an injection axis that is aligned approximately with a flow path that the ions ultimately follow around the inner electrode 102 in order to reach the ion outlet orifice 114. Now referring also to FIG. 2*a*, shown is an enlarged cross sectional view of the ion inlet orifice of the side-to-side FAIMS cell of FIG. 1*a*. The trajectory of an ion that is introduced into the FAIMS cell 100 via ion inlet orifice 108*a* oscillates toward and away from the inner electrode 102 due to the effect of the electric field within the analytical gap 106. This electric field actually extends into the ion inlet orifice 108*a* and accordingly begins to influence the ion trajectory before the ion actually enters the analytical gap 106. Because the ion is introduced along an axis that is tangential to the inner electrode 102, the ion trajectory tends to oscillate during introduction in a manner similar to that which occurs after the ion has entered the analytical gap 106. This is in contrast to the trajectory of an ion that is introduced into a prior art FAIMS cell, as is shown in FIG. 2*b*. In the prior art FAIMS cell 200, ions are introduced via an ion inlet orifice 202 such that the electric field directly opposes ion introduction during one portion of the asymmetric waveform cycle. The ions "jitter" into and out of the analytical gap 204, which is defined between inner and outer electrodes 206 and 208, respectively, as a result of the same induced oscillatory motion that is responsible for separating different types of ions one from another within the analytical gap 204. However, the ions are entrained in a flow of a carrier gas and so the ions eventually enter the analytical gap despite the effect of the electric field. Nevertheless, the ion introduction window is lengthened since the ions move alternately toward and away from the inner electrode as described above, rather than moving continuously toward the inner electrode along a straight line.

Figure 3A:
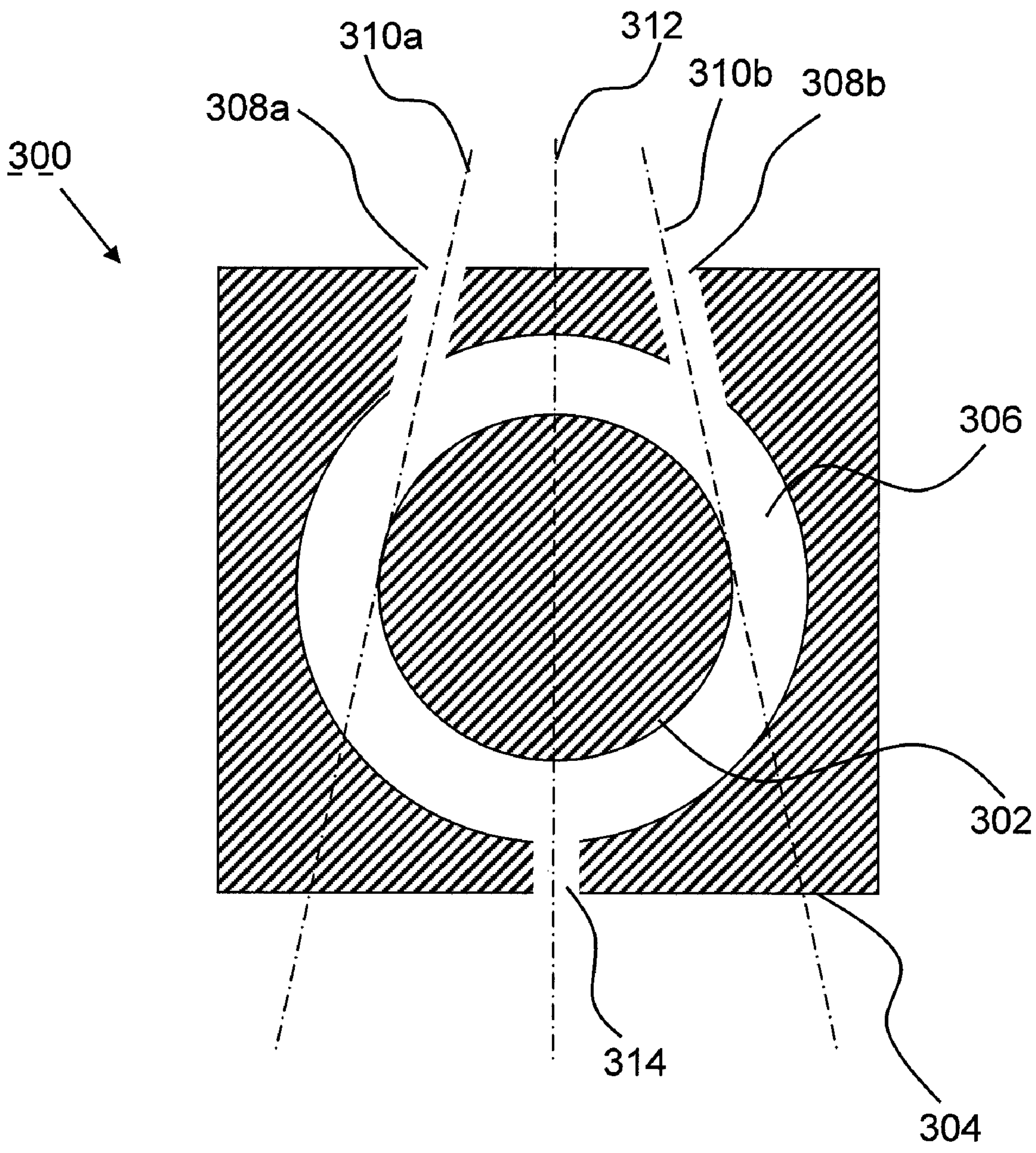
FIG. 3*a* is a cross sectional end-view of a side-to-side FAIMS cell according to an embodiment of the instant invention.

Referring now to FIG. 3*a*, shown is a cross sectional end-view of a side-to-side FAIMS cell according to an embodiment of the instant invention. The side-to-side FAIMS cell, which is shown generally at 300, includes an analyzer region that is defined by inner and outer electrodes 302 and 304, respectively. The inner electrode 302 is approximately circular in cross-section and has a generally cylindrical outer surface. The outer electrode 304 has a similarly curved inner surface that faces the outer surface of the inner electrode 302. An electrically insulating material (not shown in FIG. 3*a*) supports the inner electrode 302 and the outer electrode 304 in an overlapping, spaced-apart arrangement one relative to the other. An annular space between the outer surface of the inner electrode 302 and the inner surface of the outer electrode 304 defines an analytical gap 306 for separating different types of ions, one from another. The analytical gap 306 is of approximately uniform width and extends around the circumference of the inner electrode 302. The inner electrode 302 is in electrical communication with a not illustrated voltage source, which during use is capable of applying a high voltage asymmetric waveform (DV) and a low voltage dc compensation voltage (CV) to the inner electrode 302. Optionally, the not illustrated voltage source applies the DV to the outer electrode 304. Further optionally, the not illustrated voltage source applies the DV to the inner electrode 302 and to the outer electrode 304.

During use, ions are produced at a not illustrated ionization source and enter the analytical gap 306 via two ion inlet orifices 308*a* and 308*b*. One non-limiting example of a suitable ionization source is an electrospray ionization (ESI) source. However, when an ESI source is used with FAIMS, it is desirable to remove residual solvent prior to introducing the ion stream into the analytical gap 306. To this end, typically a separate desolvation chamber (not shown) is provided between the ionization source and the FAIMS cell. Of course, any other suitable ionization source may be utilized to produce ions. Optionally, separate ionization sources are provided including a first not illustrated ion source that is in fluid communication with ion inlet orifice 308*a* and a second ionization source that is in fluid communication with ion inlet orifice 308*b*.

Referring still to FIG. 3*a*, dotted lines 310*a* and 310*b* are shown extending along the longitudinal axis of the ion inlet orifices 308*a* and 308*b*, respectively. Each dotted line is referred to as the ion injection axis of the corresponding ion inlet orifice. In the embodiment of FIG. 3*a*, ion injection axis 310*a* is not parallel to ion injection axis 310*b*. Furthermore, dotted line 312 represents a plane of symmetry extending into and out of the plane of the page, which bisects the inner electrode 302 along the length thereof and that also bisects ion outlet orifice 314. The ion inlet orifices 308*a* and 308*b* are disposed symmetrically with respect to the plane of symmetry. Ions that are introduced via ion inlet orifice 308*a* travel along one direction (counter-clockwise in FIG. 3*a*) toward the ion outlet orifice 314. Similarly, ions that are introduced via ion inlet orifice 308*b* travel along a different direction (clockwise in FIG. 3*a*) toward the ion outlet orifice 314. The net ion flow path between ion inlet orifice 308*a* and the ion outlet orifice 314 is substantially a reflection in the plane of symmetry of the net ion flow path between ion inlet orifice 308*b* and the ion outlet orifice 314. Accordingly, ion residence times within the analytical gap 306 are substantially the same for a particular type of ion that is introduced via either the ion inlet orifice 308*a* or the ion inlet orifice 308*b*.

The ion injection axis 310*a* is substantially tangential to the outer surface along one side of inner electrode 302, and the ion injection axis 310*b* is substantially tangential to the outer surface along the opposite side of inner electrode 302. Accordingly, FAIMS cell 300 does not have any ion inlet orifices with an ion injection axis that passes through the center of inner electrode 302. Another way of stating this is to say that FAIMS cell 300 does not have any ion inlet orifices with an ion injection axis that is normal to the outer surface of the inner electrode 302 at the point of intersection.

Figure 3B:
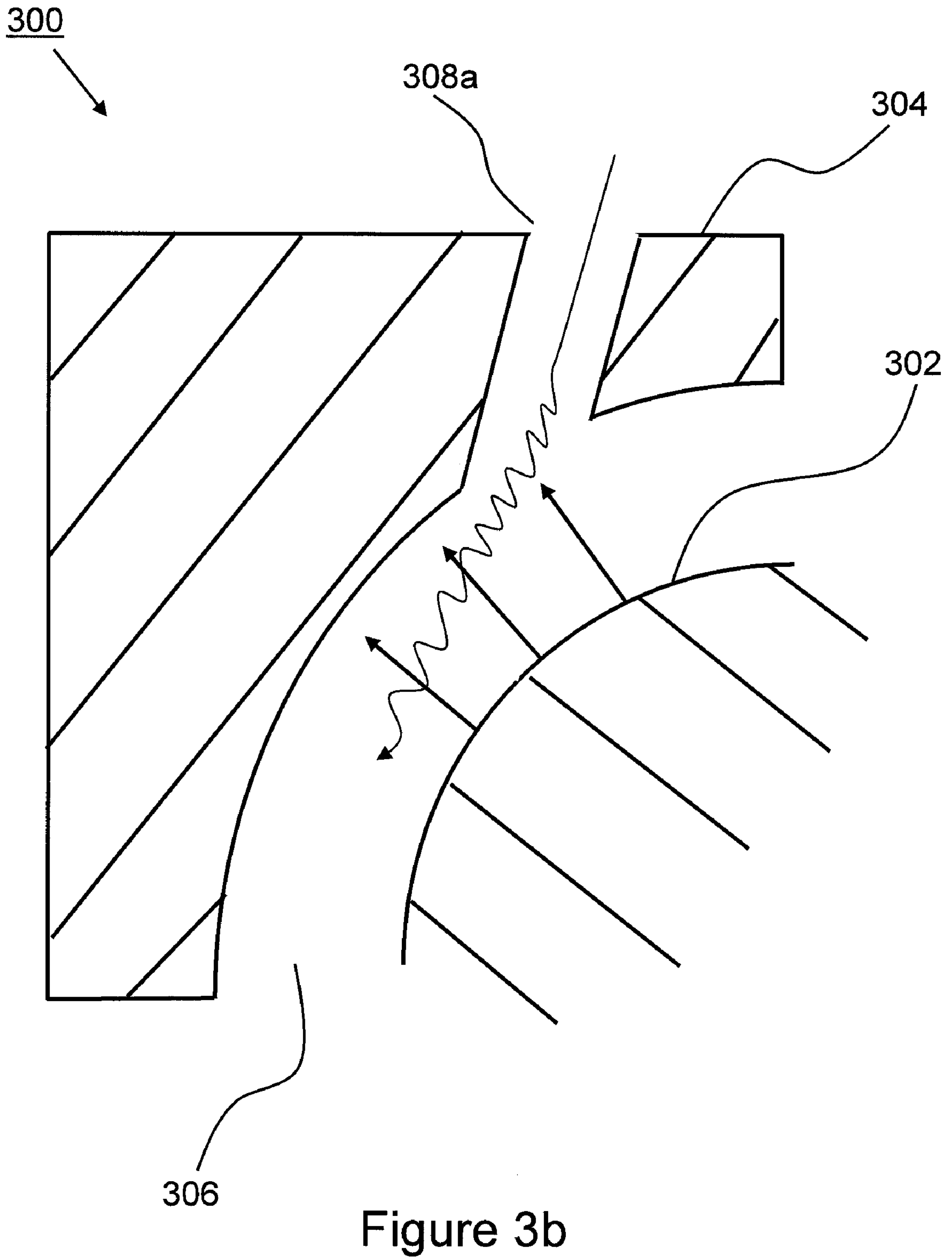
FIG. 3*b* is an enlarged cross sectional view of the ion inlet orifice of the side-to-side FAIMS cell that is shown in FIG. 3*a;*

Now referring also to FIG. 3*b*, shown is an enlarged cross sectional view of the ion inlet orifice of the side-to-side FAIMS cell of FIG. 3*a*. The trajectory of an ion that is introduced into the FAIMS cell 300 via ion inlet orifice 308*a* oscillates toward and away from the inner electrode 302 due to the effect of the electric field within the analytical gap 306. This electric field actually extends into the ion inlet orifice 308*a* and accordingly begins to influence the ion trajectory before the ion actually enters the analytical gap 306. Because the ion is introduced along an axis that is tangential to the inner electrode 302, the ion trajectory tends to oscillate during introduction in a manner similar to that which occurs after the ion has entered the analytical gap 306.

Figure 4:
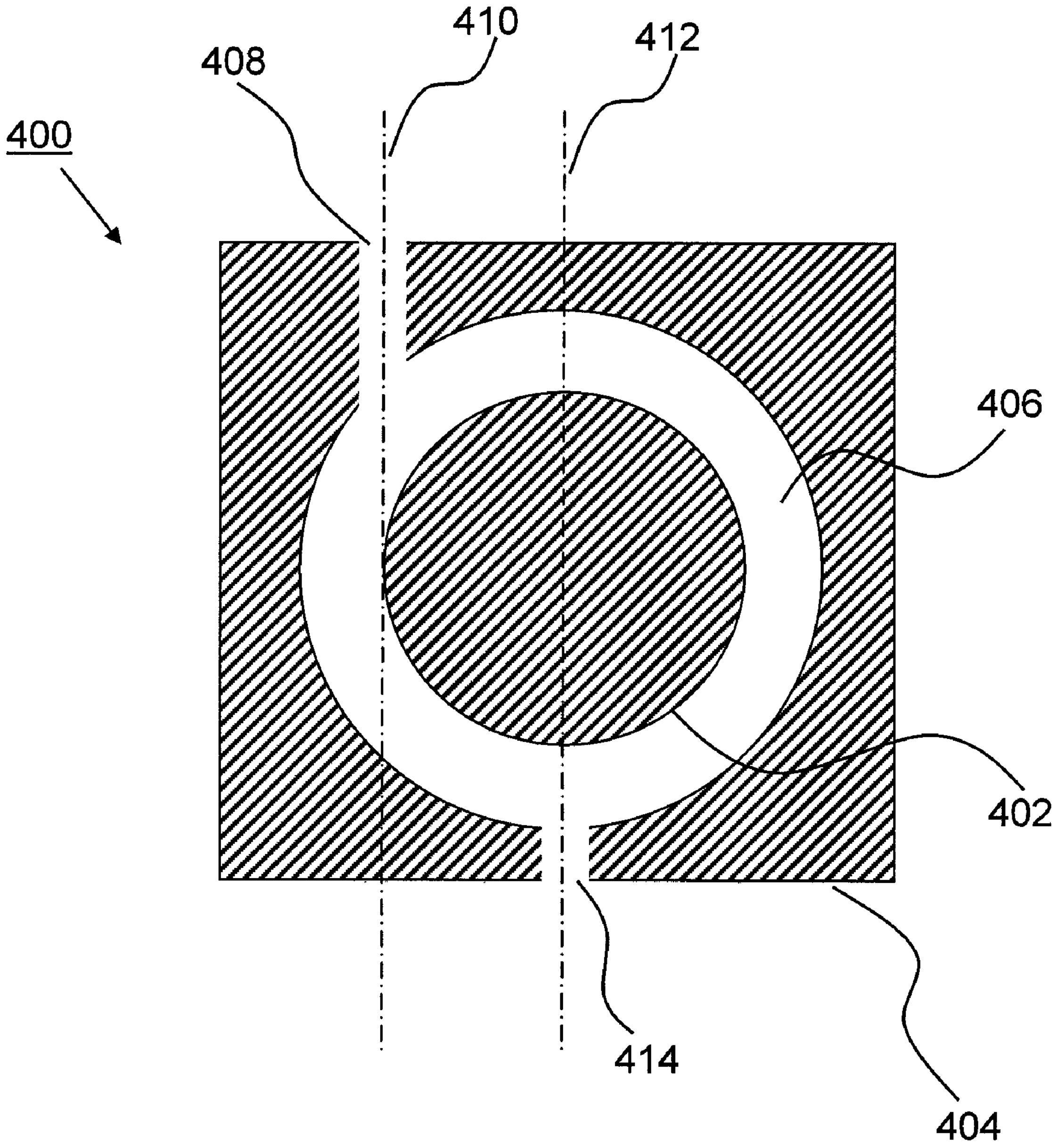
FIG. 4 is a cross sectional end-view of a side-to-side FAIMS cell according to an embodiment of the instant invention.

Referring now to FIG. 4, shown is a cross sectional end-view of a side-to-side FAIMS cell according to an embodiment of the instant invention. The side-to-side FAIMS cell, shown generally at 400, is similar to the FAIMS cell 100 that is described supra with reference to FIG. 1*a*. The FAIMS cell 400 includes an analyzer region that is defined by inner and outer electrodes 402 and 404, respectively. The inner electrode 402 is approximately circular in cross-section and has a generally cylindrical outer surface. The outer electrode 404 has a similarly curved inner surface that faces the outer surface of the inner electrode 402. An electrically insulating material (not shown in FIG. 4) supports the inner electrode 402 and the outer electrode 404 in an overlapping, spaced-apart arrangement one relative to the other. An annular space between the outer surface of the inner electrode 402 and the inner surface of the outer electrode 404 defines an analytical gap 406 for separating different types of ions, one from another. The analytical gap 406 is of approximately uniform width and extends around the circumference of the inner electrode 402. The inner electrode 402 is in electrical communication with a not illustrated voltage source, which during use is capable of applying a high voltage asymmetric waveform (DV) and a low voltage dc compensation voltage (CV) to the inner electrode 402. Optionally, the not illustrated voltage source applies the DV to the outer electrode 404. Further optionally, the not illustrated voltage source applies the DV to the inner electrode 402 and to the outer electrode 404.

During use, ions are produced at a not illustrated ionization source and enter the analytical gap 406 via ion inlet orifice 408. One non-limiting example of a suitable ionization source is an electrospray ionization (ESI) source. However, when an ESI source is used with FAIMS, it is desirable to remove residual liquid solvent prior to introducing the ion stream into the analytical gap 406. To this end, typically a separate desolvation chamber (not shown) is provided between the ionization source and the FAIMS cell. Of course, any other suitable ionization source may be utilized to produce ions.

Referring still to FIG. 4, dotted line 410 is shown extending along the longitudinal axis of the ion inlet orifice 408. The dotted line is referred to as the ion injection axis, and is substantially tangential to the outer surface along one side of inner electrode 402. Accordingly, FAIMS cell 400 does not have any ion inlet orifices with an ion injection axis that passes through the center of inner electrode 402. Another way of stating this is to say that FAIMS cell 400 does not have any ion inlet orifices with an ion injection axis that is normal to the outer surface of the inner electrode 402 at the point of intersection.

Figure 5:
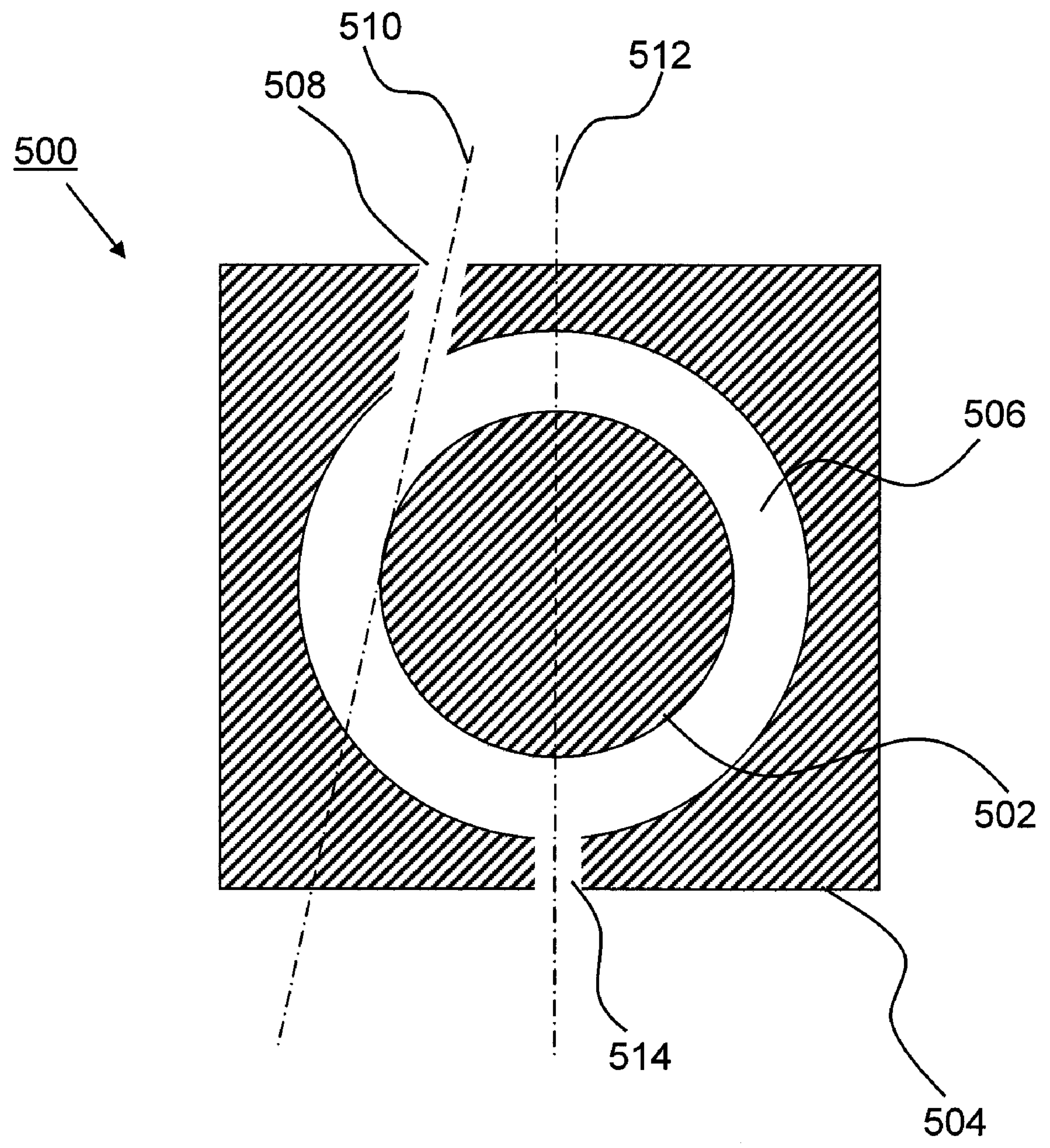
FIG. 5 is a cross sectional end-view of a side-to-side FAIMS cell according to an embodiment of the instant invention.

Referring now to FIG. 5, shown is a cross sectional end-view of a side-to-side FAIMS cell according to an embodiment of the instant invention. The side-to-side FAIMS cell, shown generally at 500, is similar to the FAIMS cell 300 that is described supra with reference to FIG. 3*a*. The FAIMS cell 500 includes an analyzer region that is defined by inner and outer electrodes 502 and 504, respectively. The inner electrode 502 is approximately circular in cross-section and has a generally cylindrical outer surface. The outer electrode 504 has a similarly curved inner surface that faces the outer surface of the inner electrode 502. An electrically insulating material (not shown in FIG. 5) supports the inner electrode 502 and the outer electrode 504 in an overlapping, spaced-apart arrangement one relative to the other. An annular space between the outer surface of the inner electrode 502 and the inner surface of the outer electrode 504 defines an analytical gap 506 for separating different types of ions, one from another. The analytical gap 506 is of approximately uniform width and extends around the circumference of the inner electrode 502. The inner electrode 502 is in electrical communication with a not illustrated voltage source, which during use is capable of applying a high voltage asymmetric waveform (DV) and a low voltage dc compensation voltage (CV) to the inner electrode 502. Optionally, the not illustrated voltage source applies the DV to the outer electrode 504. Further optionally, the not illustrated voltage source applies the DV to the inner electrode 502 and to the outer electrode 504.

During use, ions are produced at a not illustrated ionization source and enter the analytical gap 506 via ion inlet orifice 508. One non-limiting example of a suitable ionization source is an electrospray ionization (ESI) source. However, when an ESI source is used with FAIMS the ions must be desolvated prior to being introduced into the analytical gap 506. To this end, typically a separate desolvation chamber (not shown) is provided between the ionization source and the FAIMS cell. Of course, any other suitable ionization source may be utilized to produce ions.

Referring still to FIG. 5, dotted line 510 is shown extending along the longitudinal axis of the ion inlet orifice 508. The dotted line is referred to as the ion injection axis, and is substantially tangential to the outer surface along one side of inner electrode 502. Accordingly, FAIMS cell 500 does not have any ion inlet orifices with an ion injection axis that passes through the center of inner electrode 502. Another way of stating this is to say that FAIMS cell 500 does not have any ion inlet orifices with an ion injection axis that is normal to the outer surface of the inner electrode 502 at the point of intersection.

Figure 6:
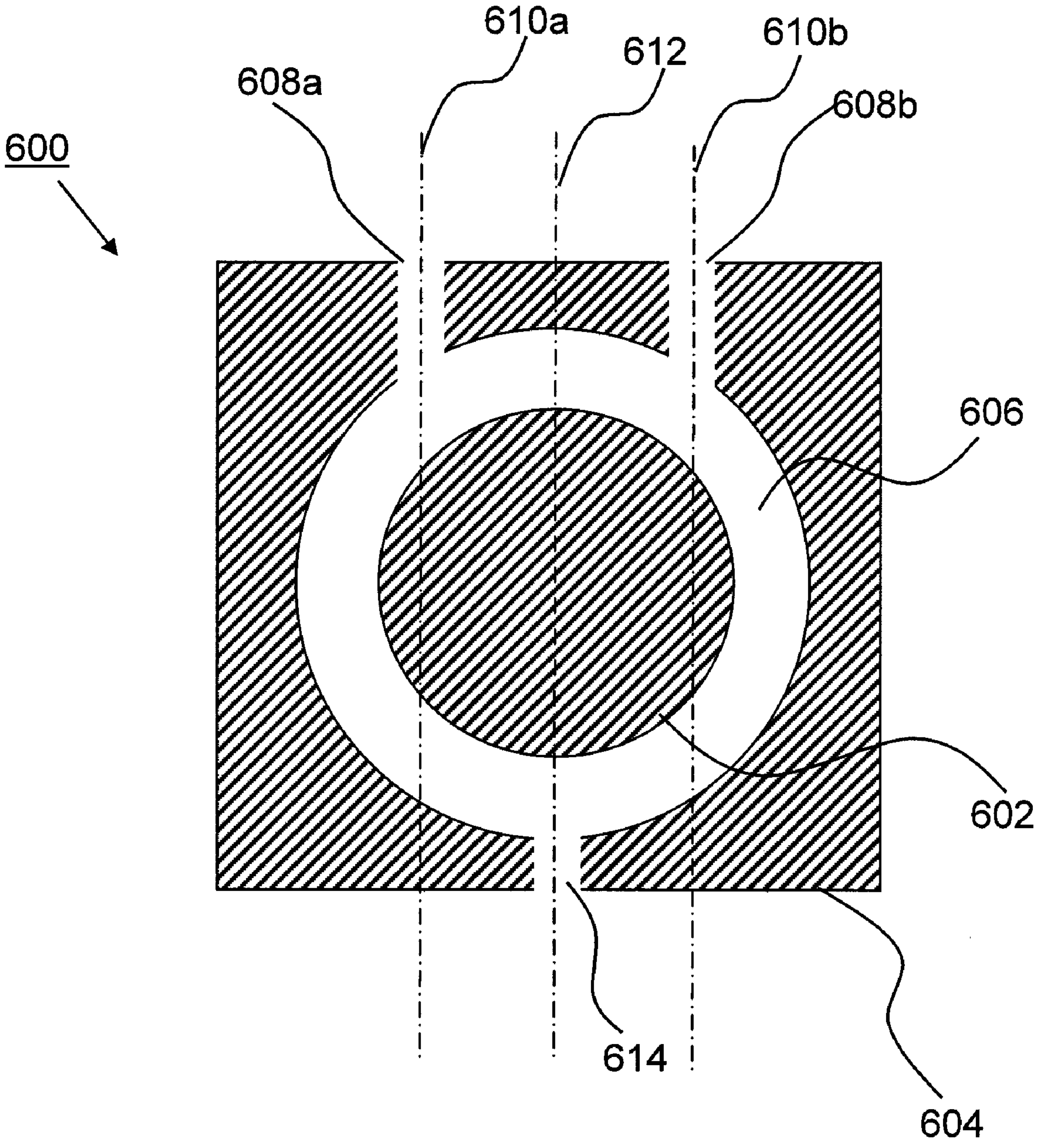
FIG. 6 is a cross sectional end-view of a side-to-side FAIMS cell according to an embodiment of the instant invention; and, FIG. 7 is a cross sectional end-view of a side-to-side FAIMS cell according to an embodiment of the instant invention.

Referring now to FIG. 6, shown is a cross sectional end-view of a side-to-side FAIMS cell according to an embodiment of the instant invention. The side-to-side FAIMS cell, shown generally at 600, is similar to the FAIMS cell 100 that is described supra with reference to FIG. 1*a*. The FAIMS cell 600 includes an analyzer region that is defined by inner and outer electrodes 602 and 604, respectively. The inner electrode 602 is approximately circular in cross-section and has a generally cylindrical outer surface. The outer electrode 604 has a similarly curved inner surface that faces the outer surface of the inner electrode 602. An electrically insulating material (not shown in FIG. 6) supports the inner electrode 602 and the outer electrode 604 in an overlapping, spaced-apart arrangement one relative to the other. An annular space between the outer surface of the inner electrode 602 and the inner surface of the outer electrode 604 defines an analytical gap 606 for separating different types of ions, one from another. The analytical gap 606 is of approximately uniform width and extends around the circumference of the inner electrode 602. The inner electrode 602 is in electrical communication with a not illustrated voltage source, which during use is capable of applying a high voltage asymmetric waveform (DV) and a low voltage dc compensation voltage (CV) to the inner electrode 602. Optionally, the not illustrated voltage source applies the DV to the outer electrode 604. Further optionally, the not illustrated voltage source applies the DV to the inner electrode 602 and to the outer electrode 604.

During use, ions are produced at a not illustrated ionization source and enter the analytical gap 606 via two ion inlet orifices 608*a* and 608*b*. One non-limiting example of a suitable ionization source is an electrospray ionization (ESI) source. However, when an ESI source is used with FAIMS, it is desirable to remove residual liquid solvent prior to introducing the ion stream into the analytical gap 606. To this end, typically a separate desolvation chamber (not shown) is provided between the ionization source and the FAIMS cell. Of course, any other suitable ionization source may be utilized to produce ions. Optionally, separate ionization sources are provided including a first not illustrated ion source that is in fluid communication with ion inlet orifice 608*a* and a second ionization source that is in fluid communication with ion inlet orifice 608*b*.

Referring still to FIG. 6, dotted lines 610*a* and 610*b* are shown extending along the longitudinal axis of the ion inlet orifices 608*a* and 608*b*, respectively. Each dotted line is referred to as the ion injection axis of the corresponding ion inlet orifice. In the embodiment of FIG. 6, ion injection axis 610*a* is parallel to ion injection axis 610*b*. Furthermore, dotted line 612 represents a plane of symmetry extending into and out of the plane of the page, which bisects the inner electrode 602 along the length thereof and that also bisects ion outlet orifice 614. The ion inlet orifices 608*a* and 608*b* are disposed symmetrically with respect to the plane of symmetry. Ions that are introduced via ion inlet orifice 608*a* travel along one direction (counter-clockwise in FIG. 6) toward the ion outlet orifice 614. Similarly, ions that are introduced via ion inlet orifice 608*b* travel along a different direction (clockwise in FIG. 6) toward the ion outlet orifice 614. The net ion flow path between ion inlet orifice 608*a* and the ion outlet orifice 614 is substantially a reflection in the plane of symmetry of the net ion flow path between ion inlet orifice 608*b* and the ion outlet orifice 614. Accordingly, ion residence times within the analytical gap 606 are substantially the same for a particular type of ion that is introduced via either the ion inlet orifice 608*a* or the ion inlet orifice 608*b*.

The ion injection axis 610*a* passes through a portion of one side of inner electrode 602, and the ion injection axis 610*b* passes through a portion of the opposite side of inner electrode 602. Unlike the embodiments described supra the ion injection axes 610*a* and 610*b* are not tangential to the outer surface of the inner electrode. However, FAIMS cell 600 still does not have any ion inlet orifices with an ion injection axis that passes through the center of inner electrode 602. Rather, each ion injection axis 610*a* and 610*b* passes through inner electrode 602 off the center thereof. Another way of stating this is to say that FAIMS cell 600 does not have any ion inlet orifices with an ion injection axis is normal to the outer surface of the inner electrode 602 at the point of intersection.

Figure 7:
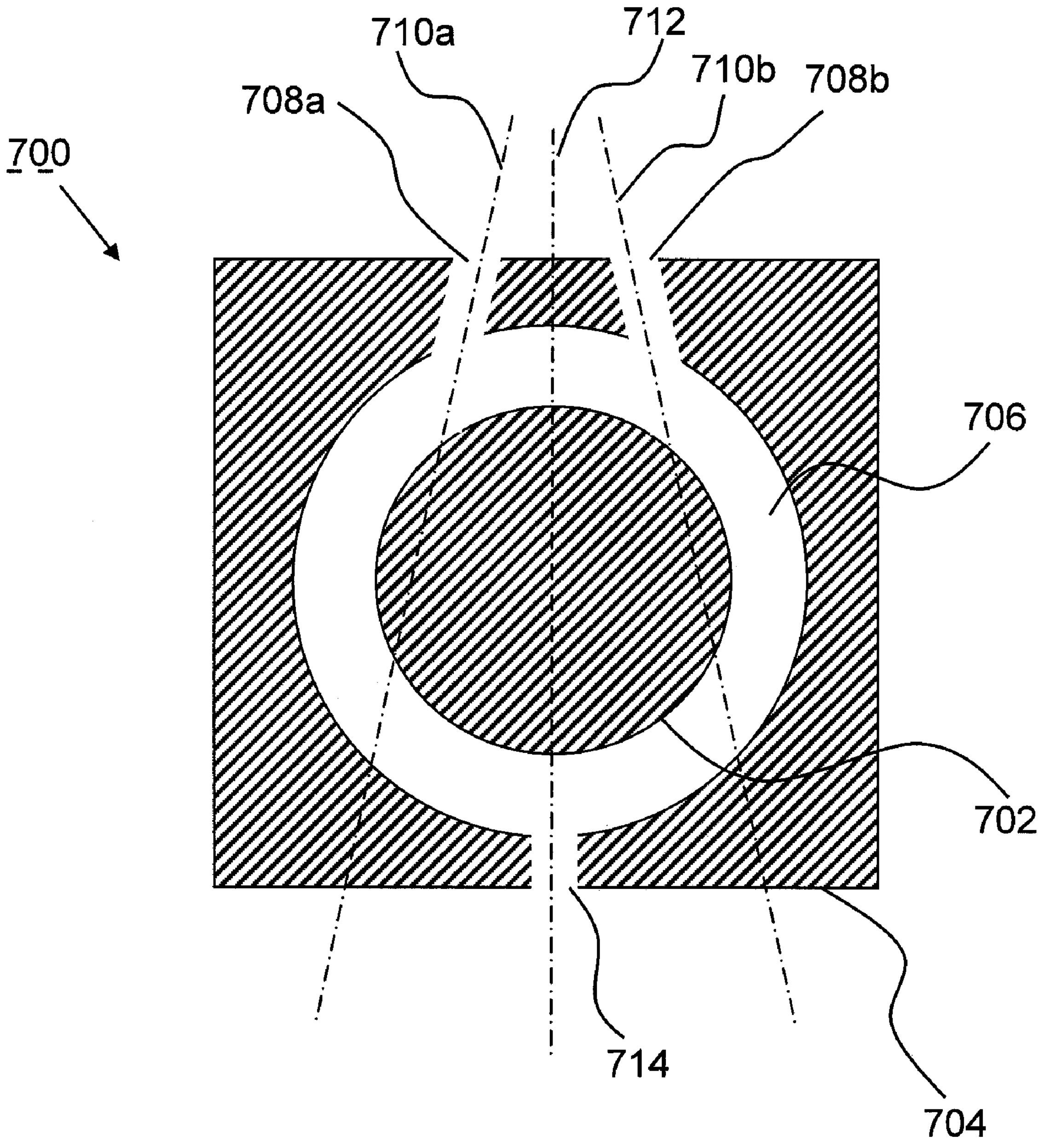

Referring now to FIG. 7, shown is a cross sectional end-view of a side-to-side FAIMS cell according to an embodiment of the instant invention. The side-to-side FAIMS cell, shown generally at 700, is similar to the FAIMS cell 300 that is described supra with reference to FIG. 3*a*. The FAIMS cell 700 includes an analyzer region that is defined by inner and outer electrodes 702 and 704, respectively. The inner electrode 702 is approximately circular in cross-section and has a generally cylindrical outer surface. The outer electrode 704 has a similarly curved inner surface that faces the outer surface of the inner electrode 702. An electrically insulating material (not shown in FIG. 7) supports the inner electrode 702 and the outer electrode 704 in an overlapping, spaced-apart arrangement one relative to the other. An annular space between the outer surface of the inner electrode 702 and the inner surface of the outer electrode 704 defines an analytical gap 706 for separating different types of ions, one from another. The analytical gap 706 is of approximately uniform width and extends around the circumference of the inner electrode 702. The inner electrode 702 is in electrical communication with a not illustrated voltage source, which during use is capable of applying a high voltage asymmetric waveform (DV) and a low voltage dc compensation voltage (CV) to the inner electrode 702. Optionally, the not illustrated voltage source applies the DV to the outer electrode 704. Further optionally, the not illustrated voltage source applies the DV to the inner electrode 702 and to the outer electrode 704.

During use, ions are produced at a not illustrated ionization source and enter the analytical gap 706 via two ion inlet orifices 708*a* and 708*b*. One non-limiting example of a suitable ionization source is an electrospray ionization (ESI) source. However, when an ESI source is used with FAIMS, it is desirable to remove residual liquid solvent prior to introducing the ion stream into the analytical gap 706. To this end, typically a separate desolvation chamber (not shown) is provided between the ionization source and the FAIMS cell. Of course, any other suitable ionization source may be utilized to produce ions. Optionally, separate ionization sources are provided including a first not illustrated ion source that is in fluid communication with ion inlet orifice 708*a* and a second ionization source that is in fluid communication with ion inlet orifice 708*b*.

Referring still to FIG. 7, dotted lines 710*a* and 710*b* are shown extending along the longitudinal axis of the ion inlet orifices 708*a* and 708*b*, respectively. Each dotted line is referred to as the ion injection axis of the corresponding ion inlet orifice. In the embodiment of FIG. 7, ion injection axis 710*a* is not parallel to ion injection axis 710*b*. Furthermore, dotted line 712 represents a plane of symmetry extending into and out of the plane of the page, which bisects the inner electrode 702 along the length thereof and that also bisects ion outlet orifice 714. The ion inlet orifices 708*a* and 708*b* are disposed symmetrically with respect to the plane of symmetry. Ions that are introduced via ion inlet orifice 708*a* travel along one direction (counter-clockwise in FIG. 7) toward the ion outlet orifice 714. Similarly, ions that are introduced via ion inlet orifice 708*b* travel along a different direction (clockwise in FIG. 7) toward the ion outlet orifice 714. The net ion flow path between ion inlet orifice 708*a* and the ion outlet orifice 714 is substantially a reflection in the plane of symmetry of the net ion flow path between ion inlet orifice 708*b* and the ion outlet orifice 714. Accordingly, ion residence times within the analytical gap 706 are substantially the same for a particular type of ion that is introduced via either the ion inlet orifice 708*a* or the ion inlet orifice 708*b*.

The ion injection axis 710*a* passes through a portion of one side of inner electrode 702, and the ion injection axis 710*b* passes through a portion of the opposite side of inner electrode 702. Unlike most of the embodiments described supra the ion injection axes 710*a* and 710*b* are not tangential to the outer surface of the inner electrode. However, FAIMS cell 700 still does not have any ion inlet orifices with an ion injection axis that passes through the center of inner electrode 702. Rather, each ion injection axis 710*a* and 710*b* passes through inner electrode 702 off the center thereof. Another way of stating this is to say that FAIMS cell 700 does not have any ion inlet orifices with an ion injection axis that is normal to the outer surface of the inner electrode 702 at the point of intersection.

Although the preceding description is presented in the context of side-to-side FAIMS cells having an inner electrode defining a portion of a right-circular cylinder, it is also envisaged that other electrode shapes may be used with the instant invention. For instance, optionally the inner electrode is substantially elliptical in shape in cross-sectional end view. Further optionally, the inner electrode has a shape that is formed by two intersecting arcs in cross-sectional end view. Optionally, the two arcs are either uniform or non-uniform. For any given inner electrode shape, it is important that no ion inlets are defined such that an ion injection axis thereof is normal to the outer surface of the inner electrode at the point of intersection.

For absolute clarity, the inventive features that are described in the preceding paragraphs may equally be incorporated into a FAIMS cell that is based on the d-FAIMS electrode geometry. In this case, the ions distribute around the inner electrode to form a ring-shaped band of ions, and the ions flow along the length of the inner electrode and around a domed terminus thereof prior to being extracted via an ion outlet. Typically, the ion outlet is spaced-apart from and aligned with the center of the dome on the end of the inner electrode. Optionally, only a single ion inlet is provided, such that an ion injection axis thereof does not pass through the center of the inner electrode. Optionally, the ion injection axis is tangential to the outer surface of the inner electrode. Further optionally, plural ion inlets are provided, none of the plural ion inlets having an ion injection axis that passes through the center of the inner electrode. While in most cases it is desirable to position each one of the plural ion inlets at a same distance from the ion outlet, it is also possible that some of the ion inlets are disposed closer to the ion outlet than other of the ion inlets.

Numerous other embodiments may be envisaged without departing from the spirit and scope of the invention.

What is claimed is:

1. A FAIMS cell, comprising:

an elongated inner electrode having a longitudinal axis extending along a first direction, the inner electrode having a curved outer surface that defines a circle when viewed in a cross section that is taken in a plane normal to the longitudinal axis, the longitudinal axis passing through the center of the circle so defined; and, an outer electrode having an inner surface that is disposed in a spaced-apart facing relationship relative to the outer surface of the inner electrode so as to define an analytical gap therebetween, there being a first ion inlet orifice defined through a first portion of the outer electrode for supporting introduction of a flow of ions into the analytical gap, the first ion inlet orifice having a first ion injection axis that does not pass through the center of the circle so defined, wherein the outer electrode does not have defined through any portion thereof an ion inlet orifice having an ion injection axis that passes through the center of the circle so defined.

2. A FAIMS cell according to claim 1, wherein the FAIMS cell is a side-to-side FAIMS cell.

3. A FAIMS cell according to claim 1, wherein the FAIMS cell is a domed-FAIMS (d-FAIMS) cell.

4. A FAIMS cell according to claim 1, comprising a voltage source for applying a radio frequency asymmetric waveform (DV) and a direct current compensation voltage (CV) to at least one of the inner electrode and the outer electrode.

5. A FAIMS cell according to claim 1, wherein the first ion injection axis defines a line that is tangential to the outer surface of the inner electrode.

6. A FAIMS cell according to claim 5, comprising an ion outlet orifice defined through a second portion of the outer electrode for supporting extraction of some ions of the flow of ions from the analytical gap.

7. A FAIMS cell according to claim 6, wherein the analytical gap has a plane of symmetry that bisects the inner electrode lengthwise and that bisects the ion outlet orifice, and comprising:

a second ion inlet orifice that is defined through a third portion of the outer electrode such that the first ion inlet orifice and the second ion inlet orifice are disposed symmetrically one on either side of the plane of symmetry, the second ion inlet orifice having a second ion injection axis that does not pass through the center of the circle so defined.

8. A FAIMS cell according to claim 7, wherein the first ion injection axis defines a line that is tangential to the outer surface of the inner electrode on one side of the plane of symmetry and the second ion injection axis defines a line that is tangential to the outer surface of the inner electrode on the opposite side of the plane of symmetry.

9. A FAIMS cell according to claim 7, wherein the first ion injection axis is substantially parallel to the second ion injection axis.

10. A FAIMS cell according to claim 7, wherein the first ion injection axis and the second ion injection axis diverge increasingly one from the other along a direction of ion flow within the analytical gap.

11. A FAIMS cell according to claim 7, comprising only one ionization source disposed in fluid communication with the first ion inlet orifice and with the second ion inlet orifice, for providing a flow of ions including ions of different types for introduction into the analytical gap via both the first ion inlet orifice and the second ion inlet orifice.

12. A FAIMS cell according to claim 7, comprising a first ionization source in fluid communication with the first ion inlet orifice and comprising a second ionization source in fluid communication with the second ion inlet orifice.

13. A FAIMS cell, comprising:

a generally cylindrically-shaped inner electrode having an outer surface; and, an outer electrode having an inner surface that is disposed in a spaced-apart overlapping relationship relative to the outer surface of the inner electrode so as to define an annular analytical gap of approximately uniform width therebetween, there being a first ion inlet orifice defined through a first portion of the outer electrode for supporting introduction of a flow of ions into the analytical gap, the first ion inlet orifice being open at opposite ends thereof and having a first ion injection axis that passes through the center of each one of the opposite ends, the first ion injection axis not being normal to the outer surface of the inner electrode at the point of intersection, wherein the outer electrode does not have defined through any portion thereof an ion inlet orifice having an ion injection axis that is normal to the outer surface of the inner electrode at the point of intersection.

14. A FAIMS cell according to claim 13, wherein the FAIMS cell is a side-to-side FAIMS cell.

15. A FAIMS cell according to claim 13, wherein the FAIMS cell is a domed-FAIMS (d-FAIMS) cell.

16. A FAIMS cell according to claim 13, comprising a voltage source for applying a radio frequency asymmetric waveform (DV) and a direct current compensation voltage (CV) to at least one of the inner electrode and the outer electrode.

17. A side-to-side FAIMS cell according to claim 13, comprising an ion outlet orifice defined through a second portion of the outer electrode for supporting extraction of some ions of the flow of ions from the analytical gap.

18. A FAIMS cell according to claim 17, wherein the analytical gap has a plane of symmetry that bisects the inner electrode lengthwise and that bisects the ion outlet orifice, and comprising:

a second ion inlet orifice that is defined through a third portion of the outer electrode such that the first ion inlet orifice and the second ion inlet orifice are disposed symmetrically one on either side of the plane of symmetry, the second ion inlet orifice having a second ion injection axis that is not normal to the outer surface of the inner electrode at the point of intersection.

19. A FAIMS cell according to claim 18, wherein the first ion injection axis defines a line that is tangential to the outer surface of the inner electrode on one side of the plane of symmetry and the second ion injection axis defines a line that is tangential to the outer surface of the inner electrode on the opposite side of the plane of symmetry.

20. A FAIMS cell according to claim 18, wherein the first ion injection axis is substantially parallel to the second ion injection axis.

21. A FAIMS cell according to claim 18, wherein the first ion injection axis and the second ion injection axis diverge increasingly one from the other along a direction of ion flow within the analytical gap.

22. A FAIMS cell according to claim 18, comprising only one ionization source disposed in fluid communication with the first ion inlet orifice and with the second ion inlet orifice, for providing a flow of ions including ions of different types for introduction into the analytical gap via both the first ion inlet orifice and the second ion inlet orifice.

23. A FAIMS cell according to claim 18, comprising a first ionization source in fluid communication with the first ion inlet orifice and comprising a second ionization source in fluid communication with the second ion inlet orifice.

24. A FAIMS cell according to claim 13, wherein the inner electrode is substantially circular when viewed in a cross section that is taken in a plane normal to a longitudinal axis thereof.

25. A FAIMS cell according to claim 13, wherein the inner electrode is substantially elliptical when viewed in a cross section that is taken in a plane normal to a longitudinal axis thereof.

26. A FAIMS cell, comprising:

a generally cylindrically-shaped inner electrode having an outer surface; and, an outer electrode having an inner surface that is disposed in a spaced-apart overlapping relationship relative to the outer surface of the inner electrode so as to define an annular analytical gap of approximately uniform width therebetween, there being a first ion inlet orifice defined through a first portion of the outer electrode for supporting introduction of a flow of ions into the analytical gap, the first ion inlet orifice being open at opposite ends thereof and having a first ion injection axis that passes through the center of each one of the opposite ends of the first ion inlet, the first ion injection axis being substantially tangential to the outer surface of the inner electrode.

* * * * *